W. C. GARNER.
ELECTRICAL HEATING ELEMENT.
APPLICATION FILED SEPT. 25, 1920.
1,396,105.
Patented Nov. 8, 1921.
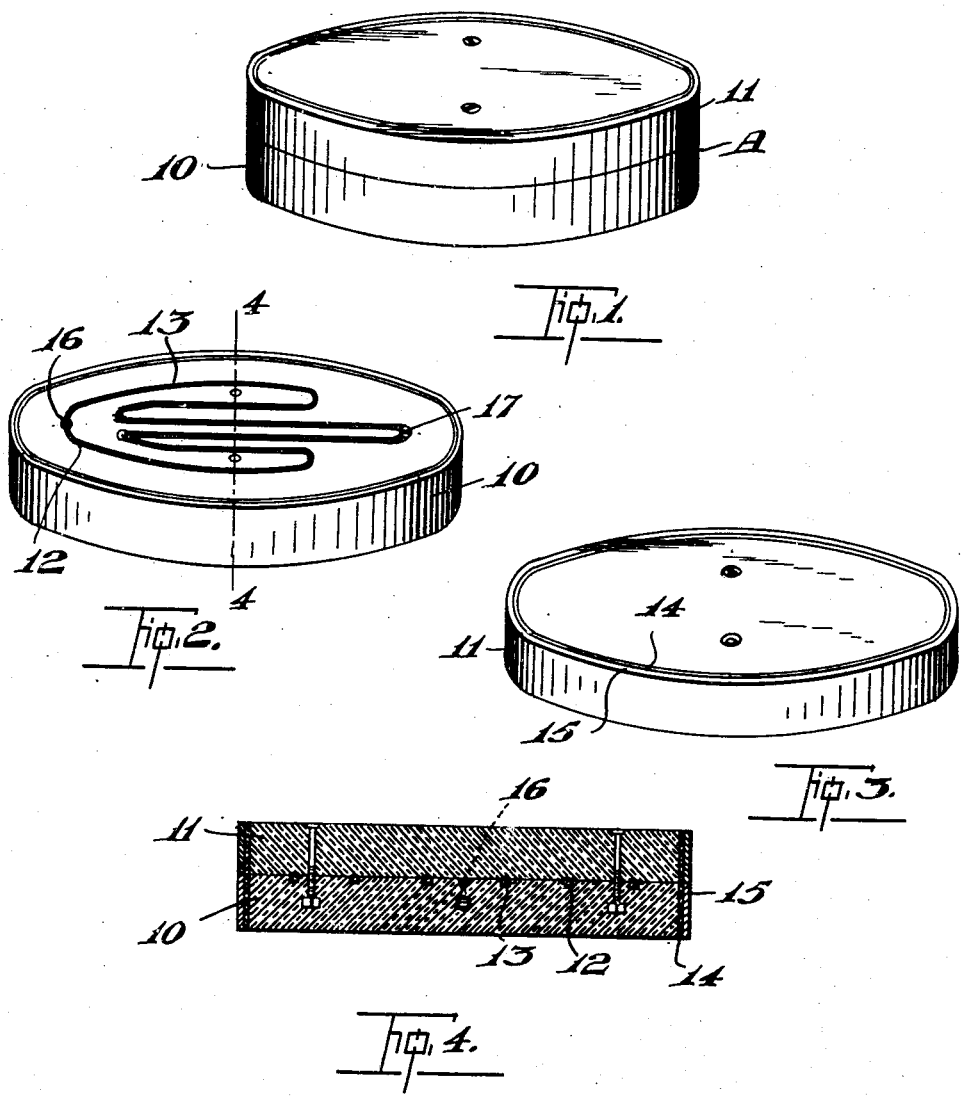

UNITED STATES PATENT OFFICE.

WELBORN C. GARNER, OF EDMONTON, ALBERTA, CANADA.

ELECTRICAL HEATING ELEMENT.

1,396,105.   Specification of Letters Patent.   Patented Nov. 8, 1921.

Application filed September 25, 1920. Serial No. 412,803.

*To all whom it may concern:*

Be it known that I, WELBORN CLAY GARNER, a subject of the King of Great Britain, a resident of the city of Edmonton, Province of Alberta, Dominion of Canada, have invented certain new and useful Improvements in Electrical Heating Elements, of which the following is a specification.

This invention relates to improvements in electrical heating elements of the type adapted to be used in electrical heaters such as shown in my co-pending application No. 412,802, designed to be used for heating or cooking purposes and the objects of the invention are to provide a suitable heater which will store the heat collected by an electrical heater and distribute the same in the best manner calculated to increase the efficiency of the heater and give good practical results, to so construct the heating element that the electrical resistance will be embedded within the heat retaining material and means are provided whereby the circulation of air over the electrical resistance will be entirely eliminated.

Further objects still are to so construct the heating element that it will be simple in construction and easily accessible for inspection and repair, and adapt the several parts to better perform the functions required of them.

With the above and other objects in view, the invention consists essentially of the improved construction and arrangement of parts particularly described and set forth in the following specification and drawings.

In the drawings;

Figure 1 is a specific view of my improved heating element.

Fig. 2 is a perspective view of the lower portion of the heating element showing the resistance embedded therein.

Fig. 3 is a perpective view of the upper portion of the heating element designed to be placed on the lower portion, and close the electrical resistance.

Fig. 4 is a transverse section of the heating element.

Like characters of reference refer to like parts in the several figures.

Referring to the drawings, A represents my improved heating element which consists of a heat retaining member formed of two portions 10 and 11, the portion 10 forming the lowermost portion and being provided in the upper face with suitable recesses or grooves 12 in which the electrical resistance 13 is embedded.

The upper portion 11 of the heat retaining member may be formed with grooves similar to those in the lower portion 10, and when the two portions 10 and 11 are placed together, the electrical resistance will be totally embedded when closed.

Around the periphery of the heat retaining member I provide a strip of heat insulating material 14, and a metallic band 15 embraces this strip of heat insulating material, and the periphery of the heat retaining member holding the same in assembled position and forming a single unit. Suitable bolt means may be utilized if necessary to secure the upper and lower members 11 and 10 together.

The ends of the resistance embedded between the upper and lower members are connected to the posts 16 and 17, which in turn are attached to any suitable source of electrical power.

This heating element can be used in an infinite number of ways, as a heater or as a cooking element, and it is of an extremely simple nature and not liable to go out of order.

By providing the strip of insulating material around the periphery of the heat retaining member, it prevents any currents of air passing between the two portions 10 and 11 of the heat retaining member, and passing over the electrical resistance, so that in this way the lifetime of the heater will be greatly increased, besides which the efficiency will remain high. Any suitable stand can be utilized with this heater.

As many changes could be made in the above construction, and many apparently widely different embodiments of my invention, within the scope of the claim constructed without departing from the spirit or scope thereof, it is intended that all matter contained in the accompanying specification and drawings, shall be interpreted as illustrative and not in a limiting sense.

What I claim as my invention is:—

An electric heating element comprising upper and lower members of heat retaining material having parallel upper and lower surfaces and meeting on a plane parallel to said upper and lower surfaces, a resistance element located between the said members and embedded in them, a heat insulating strip extending around the periphery of the said members, a metallic band extending transversely to the line of meeting between the said upper and lower members and embracing the strip of heat insulating material and retaining it in position.

In witness whereof I have hereunto set my hand in the presence of two witnesses.

WELBORN C. GARNER.

Witnesses:
 JAMES MITCHELL,
 CLARICE FERGUSON.